United States Patent
Dhanda et al.

(10) Patent No.: US 8,817,405 B1
(45) Date of Patent: Aug. 26, 2014

(54) MAGNETIC RECORDING DISK DRIVE WITH FREQUENCY ADJUSTMENT FOR MISALIGNED SERVO PATTERNS

(71) Applicant: HGST Netherlands B.V., Amsterdam (NL)

(72) Inventors: Abhishek Dhanda, San Jose, CA (US); Toshiki Hirano, San Jose, CA (US); Tetsuo Semba, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/062,883

(22) Filed: Oct. 24, 2013

(51) Int. Cl.
*G11B 5/09* (2006.01)

(52) U.S. Cl.
USPC .................................................. 360/51

(58) Field of Classification Search
None
See application file for complete search history.

(56) References Cited

U.S. PATENT DOCUMENTS

| | | | | |
|---|---|---|---|---|
| 5,177,651 A | * | 1/1993 | Moraru et al. | 360/77.08 |
| 5,278,703 A | * | 1/1994 | Rub et al. | 360/51 |
| 5,448,429 A | * | 9/1995 | Cribbs et al. | 360/75 |
| 5,796,711 A | * | 8/1998 | Tomita et al. | 369/275.4 |
| 5,809,006 A | * | 9/1998 | Davis et al. | 369/47.49 |
| 5,999,110 A | * | 12/1999 | Blaum et al. | 341/59 |
| 6,594,217 B1 | | 7/2003 | Reed | |
| 7,184,234 B2 | | 2/2007 | Kim | |
| 7,209,314 B2 | | 4/2007 | Bandic et al. | |
| 7,212,374 B1 | | 5/2007 | Wang et al | |
| 7,236,433 B2 | * | 6/2007 | Kando et al. | 369/44.13 |
| 7,286,317 B1 | | 10/2007 | Li et al. | |
| 7,339,761 B1 | | 3/2008 | Tu et al. | |
| 7,508,611 B2 | | 3/2009 | Buch et al. | |
| 7,511,909 B2 | * | 3/2009 | Lin et al. | 360/51 |
| 7,551,390 B1 | | 6/2009 | Wang et al. | |
| 7,859,778 B1 | | 12/2010 | Vikramaditya et al. | |
| 7,880,992 B2 | | 2/2011 | Ozturk et al. | |
| 2003/0185115 A1 | * | 10/2003 | Yamamoto et al. | 369/47.3 |
| 2004/0201913 A1 | * | 10/2004 | Sutardja | 360/51 |
| 2009/0067082 A1 | * | 3/2009 | Albrecht | 360/75 |
| 2013/0003214 A1 | * | 1/2013 | Grundvig et al. | 360/51 |

\* cited by examiner

*Primary Examiner* — Peter Vincent Agustin
(74) *Attorney, Agent, or Firm* — Thomas R. Berthold

(57) ABSTRACT

A magnetic recording hard disk drive has a servo clock that provides a varying frequency to the sync mark detector as a function of the radial position of the head as it crosses a servo section. The varying frequency compensates for circumferential misalignment of the sync marks in the servo sections. As the head moves radially across the tracks in a servo section during a seek, the frequency of the servo clock is continually adjusted based on the known radial velocity of the head and the known sync mark circumferential misalignment. The sync mark misalignment as a function of radius is measured as part of a calibration process, typically during disk drive manufacturing. The adjusted frequency adjusts the sample rate at which the sync mark detector samples the incoming sync marks.

15 Claims, 12 Drawing Sheets

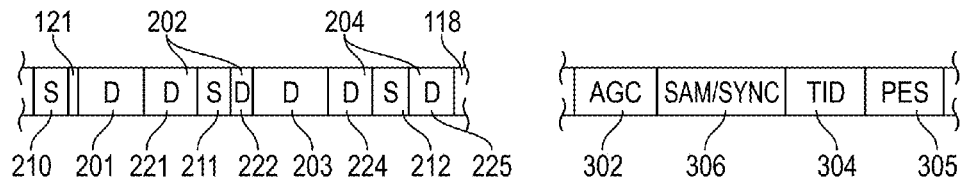
FIG. 2A
(Prior Art)
FIG. 2B
(Prior Art)
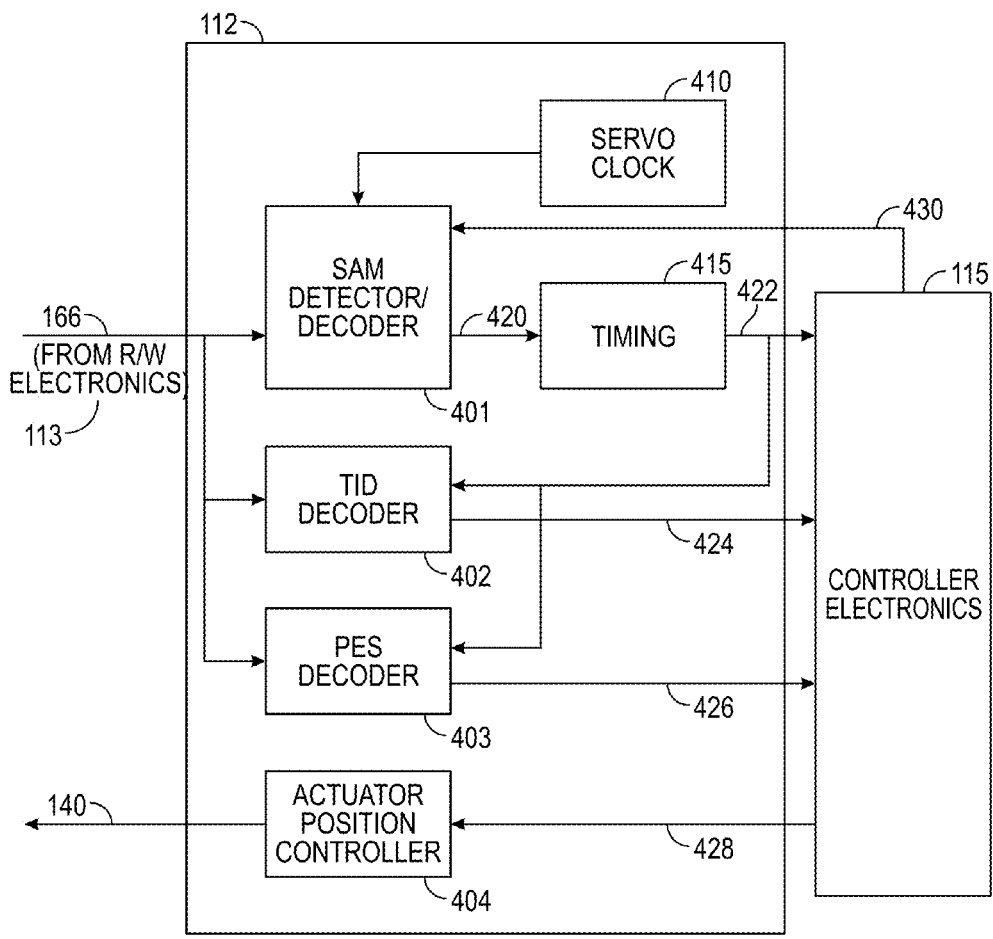
FIG. 3
(Prior Art)

Traditional Servo with Constant Frequency, Varying Bit Pitch

Continuous Zoned Servo with Constant Bit Pitch, Varying Frequency

MAGNETIC RECORDING DISK DRIVE WITH FREQUENCY ADJUSTMENT FOR MISALIGNED SERVO PATTERNS

BACKGROUND OF THE INVENTION

1. Field of the Invention

This invention relates generally to magnetic recording hard disk drives (HDDs), and more particularly to the HDD servo positioning system to locate and maintain the read/write heads on the data tracks.

2. Description of the Related Art

Magnetic recording hard disk drives (HDDs) use a servo-mechanical positioning system to hold the read/write head on the desired data track and to seek from track to track as required to perform read and write operations. Special "servo" information is written in fields in circumferentially-spaced servo sectors in each of the concentric data tracks on each disk surface. The servo sectors are constructed across multiple tracks to form angularly-spaced radially-directed servo sections that extend across the data tracks. As the servo sectors pass the read head, the readback signal is decoded to yield the position error signal (PES) that represents the radial position of the head. The servo sectors are typically written onto the disk during manufacturing in a process known as servowriting.

The servo sector includes a preamble, a servo address mark (SAM), a track identification (TID) field and a position error signal (PES) field. The preamble is typically an automatic gain control (AGC) field that is a regular series of transitions and is nominally the same at all radial positions. The AGC field allows the servo controller to calibrate gain parameters for the later TID and PES fields. The SAM field provides synchronization marks that allow the servo controller to synchronize with the later TID and PES fields. However, the servo writing process may result in track-to-track circumferential misalignment of the servo sectors. This does not generally present a problem during track following, i.e., when the read head is maintained on a single track because the frequency of the preamble transitions is constant. However, during a seek from one track to another track the read head has a radial velocity and may cross multiple tracks within a single servo section. If the misalignment of the preambles from track-to-track is too large, the servo system may not be able to acquire synchronization or may lose synchronization because the misalignment causes the frequency of the transitions in the SAM field to change with radial position.

What is needed is a HDD with a servo system that can adjust for frequency variations in the servo sector preamble transitions as the head crosses the servo sections during a track seek.

SUMMARY OF THE INVENTION

Embodiments of this invention relate to a HDD with a servo clock that provides a varying frequency to the sync mark detector as a function of the radial position of the head as it crosses a servo section. The varying frequency compensates for circumferential misalignment of the sync marks in the servo sections. As the head moves radially across the tracks in a servo section during a seek, the frequency of the servo clock is adjusted based on the known radial velocity of the head and the known sync mark circumferential misalignment. The sync mark misalignment as a function of radius H(r) is measured as part of a calibration process, typically during disk drive manufacturing. The measured sync mark misalignment values can be stored in a look-up table or used in a curve-fitting algorithm to generate a polynomial function. The change in H(r) as a function of r can be defined as $S(r)=\Delta H(r)/\Delta r$. The values of S(r) can be calculated from H(r) as part of the calibration method and stored in a look-up table. If H(r) is a polynomial then S(r) is just the derivative of H(r).

In one embodiment the frequency adjustment as a function of radius is given by:

$$\Delta F(r)=\Delta F/\Delta r=-F_0^2 S(r)/r\omega$$

where $F_0$ is the nominal frequency of the servo clock and $\omega$ is the angular velocity of the disk. The servo clock frequency is continually adjusted as the head moves radially across the servo section. The adjusted frequency adjusts the sample rate at which the sync mark detector samples the incoming sync marks.

In a modification of the method for adjusting servo clock frequency as a function of radial position of the read head during a seek, a ramping function can be applied, wherein each adjustment to the servo clock frequency is an incremental adjustment from the previous adjustment. The servo clock nominal frequency $F_0$ is thus continually ramped up or down during the time the head is crossing the servo section.

For a fuller understanding of the nature and advantages of the present invention, reference should be made to the following detailed description taken together with the accompanying figures.

BRIEF DESCRIPTION OF THE DRAWING

FIG. 2A is a portion of a typical data track on the disk of the disk drive shown in FIG. 1 according to the prior art.

FIG. 2B is an expanded view of one of the servo sectors in the data track of FIG. 2A according to the prior art.

FIG. 3 is a block diagram of the prior art servo electronics in the disk drive in FIG. 1.

DETAILED DESCRIPTION OF THE INVENTION

Figure 1:
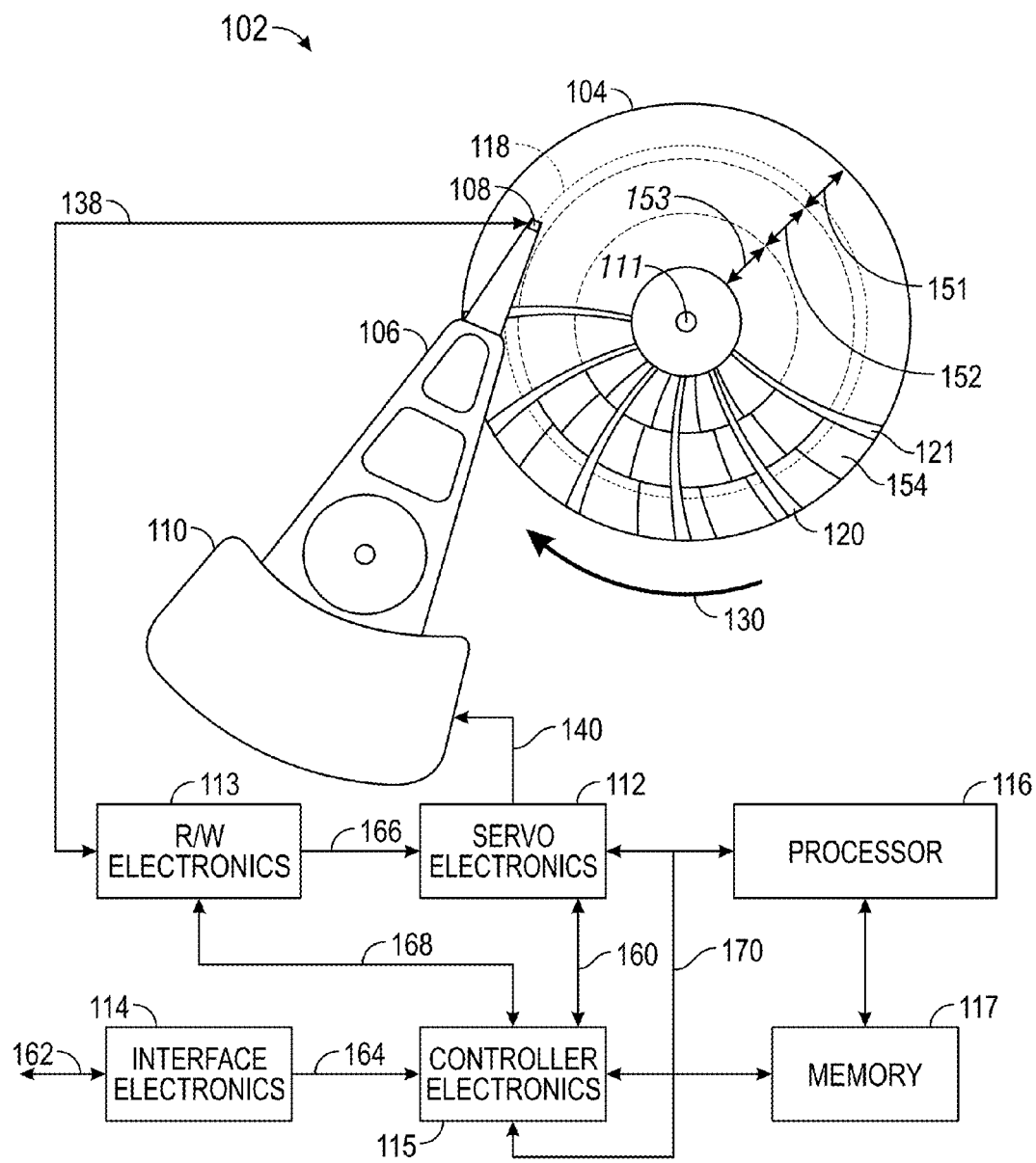
FIG. 1 is a block diagram of a disk drive of the type usable with the present invention.

FIG. 1 is a block diagram of a disk drive of the type usable with the present invention. The disk drive depicted is one that is formatted using a fixed-block "headerless" architecture with sector servo and zone-bit recording (ZBR).

The disk drive, designated generally as 102, includes data recording disk 104, actuator arm 106, data recording transducer 108 (also called a head, recording head or read/write head), voice coil motor 110, servo electronics 112, read/write electronics 113, interface electronics 114, controller electronics 115, a processor 116, and memory 117. The recording head 108 may be an inductive read/write head or a combination of an inductive write head with a magnetoresistive read head. Typically, there are multiple disks stacked on a hub that is rotated by a disk motor, with a separate recording head associated with each surface of each disk. Data recording disk 104 has a center of rotation 111 and is rotated in direction 130. Disk 104 is divided for head positioning purposes into a set of radially-spaced typically concentric tracks, one of which is shown as track 118. The tracks are grouped radially into a number of zones, three of which are shown as zones 151, 152 and 153. Each track includes a plurality of circumferentially or angularly-spaced nondata servo sectors. The servo sectors in each track are aligned circumferentially with the servo sectors in the other tracks so that they extend across the tracks in a generally radial direction to form radially-directed servo sections 120. The servo sectors are nondata regions on the disk that are typically formatted during disk drive manufacturing and are not intended to be erased during operation. Each track also has a reference index 121 indicating the start of track. Within each zone, the tracks are also circumferentially divided into a number of data sectors 154 where user data is stored. In this example the data sectors contain no data sector identification (ID) fields for uniquely identifying the data sectors so the drive is considered to have a "No-ID"™ type of data architecture, also called a "headerless" data architecture. If the disk drive has multiple heads, then the set of tracks that are at the same radius on all disk data surfaces is referred to as a "cylinder".

Read/write electronics 113 receives signals from head 108, passes servo information from the servo sectors to servo electronics 112, and passes data signals to controller electronics 115. Servo electronics 112 uses the servo information to produce a current at 140 that drives voice coil motor 110 to position the head 108 to the desired data tracks. Interface electronics 114 communicates with a host system (not shown) over interface 162, passing data and command information. Interface electronics 114 also communicates with controller electronics 115 over interface 164. Processor 116 is coupled to memory 117 and communicates with the various other disk drive electronics over interface 170. The processor 116 runs a computer program that is stored in memory and that embodies the logic and algorithms described herein. The memory 117 may be separate from the processor or as embedded memory on the processor chip. The computer program may also be implemented in microcode or other type of memory accessible to the processor. While FIG. 1 depicts a separate processor 116 for performing the functions described herein, the processor may be part of the controller electronics 115.

In the operation of disk drive 102, interface electronics 114 receives a request for reading from or writing to data sectors 154 over interface 162. Controller electronics 115 receives a list of requested data sectors from interface electronics 114 and converts them into zone, cylinder, head, and data sector numbers that uniquely identify the location of the desired data sectors. The head and cylinder information are passed to servo electronics 112, which positions head 108 over the appropriate data sector on the appropriate cylinder. If the cylinder number provided to servo electronics 112 is not the same as the cylinder number over which head 108 is presently positioned, servo electronics 112 first executes a seek operation to reposition head 108 over the appropriate cylinder. The servo electronics selects a seek velocity profile based on the length of the seek, so during a seek the head moves with a known velocity $V_r$ across the tracks.

Once servo electronics 112 has positioned head 108 over the appropriate cylinder, servo electronics 112 begins executing sector computations to locate and identify the desired data sector. As servo sectors pass under head 108, the headerless architecture technique identifies each servo sector. In brief, a servo address mark (SAM) in each servo sector is used to locate servo sectors, and a count of SAMs from a servo sector containing an index mark 121 uniquely identifies each servo sector. If the disk drive uses the older architecture with headers, then every sector is marked with a field containing a servo sector number that is read by the servo electronics and used to uniquely identify each servo sector. Additional information is maintained in association with servo electronics 112 and controller electronics 115 for controlling the reading or writing of data in the data sectors.

Referring now to FIG. 2A, a portion of a typical track 118 on the disk 104 is shown expanded. Four complete data sectors are shown (201, 202, 203 and 204). Three representative servo sectors 210, 211, and 212 are also shown. As can be seen from this example, some data sectors are split by servo sectors, and some data sectors do not start immediately following a servo sector. For example, data sectors 202 and 204 are split by servo sectors 211 and 212, respectively. Data sector 202 is split into data sections 221 and 222, and data sector 204 is split into data sections 224 and 225. Data sector 203 starts immediately after the end of data sector 202, rather than immediately following a servo sector. The index mark 121 indicates the beginning of the track and is shown contained in servo sector 210.

FIG. 2B is an expanded view of one of the servo sectors illustrated in FIG. 2A. The servo sectors are nondata regions that cannot be erased during normal operation of the disk drive. Each servo sector contains an automatic gain control (AGC) field 302 that allows the servo electronics to calibrate gain parameters for later fields. Each servo sector contains a SAM/SYNC field 306. The SAM/SYNC field 306 serves as a timing reference for reading the subsequent servo information in track identification (TID) field 304 and position error signal (PES) field 305. The SAM/SYNC field is sometimes also referred to as a servo identification (SID) mark, or servo sync mark.

FIG. 3 is a block diagram of the servo electronics 112. In operation, controller electronics 115 provides input to actuator position control 404, which in turn provides a signal 140 to the actuator to position the head. The controller electronics 115 uses the servo information read from the servo sectors to determine the input 428 to the actuator position control 404. The servo information is read by the read/write electronics 113 (FIG. 1), and signals 166 are input to the servo electronics 112. A SAM detector/decoder 401 receives a sync signal from the sync marks read by the read head from the SAM/SYNC field 306. The SAM detector/decoder 401 receives the clocked data stream 166 as input from the read/write electronics 113, and a control input 430 from the controller electronics 115. The SAM detector/decoder 401 is controlled by a servo clock 410. The servo clock 410 operates at a nominal frequency that serves as the sample rate for the SAM detector/decoder 401 to sample the SAM/SYNC marks. When sync is established a SAM found signal 420 is generated. The SAM found signal 420 is used to adjust timing circuit 415, which controls the operating sequence for the remainder of the servo sector.

After detection of a SAM, the track identification (TID) decoder 402 receives timing information 422 from timing circuit 415, reads the clocked data stream 166, which is typically Gray-code encoded, and then passes the decoded TID information 424 to controller electronics 115. Subsequently, PES decode circuit 403 captures the PES signal from read/write electronics 166, then passes position information 426 to controller electronics 115. Inputs to the PES decode circuit 403 are typically analog, although they may be digital or of any other type.

Figure 4:
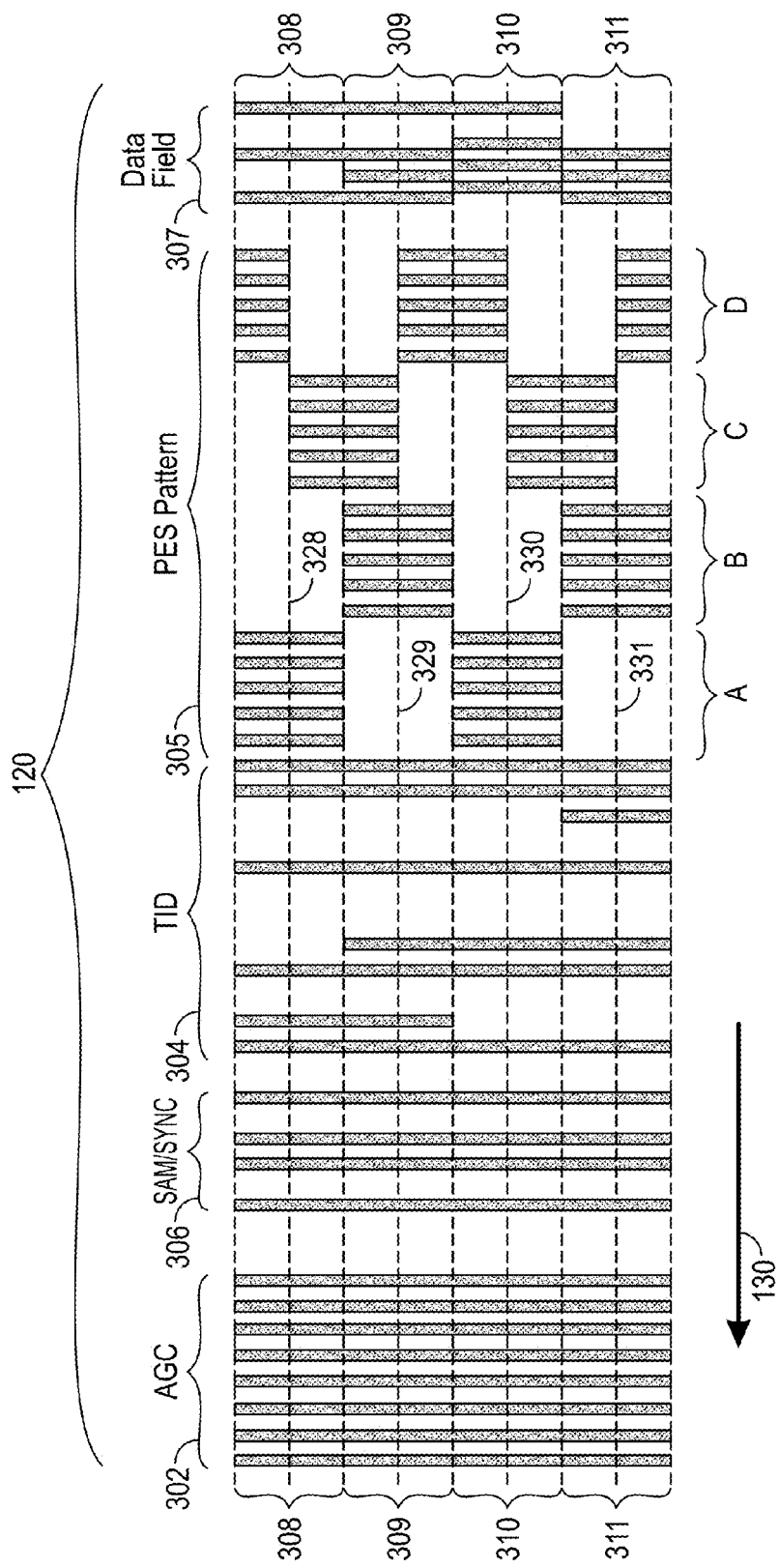
FIG. 4 is a schematic of prior art servo pattern.

FIG. 4 is a schematic of a portion of a data field 307 and a conventional servo pattern of the type commonly used in sector servo systems. FIG. 4 shows a greatly simplified pattern for clarity with only four data tracks (tracks 308, 309, 310 and 311 having track centerlines 328, 329, 330 and 331, respectively). The servo pattern precedes the data field 307 and moves relative to head 108 in the direction shown by arrow 130. The two possible magnetic states of the medium are indicated as black and white regions. FIG. 4 shows the servo pattern in only four radially-adjacent servo sectors in one servo section 120 of the disk, but the pattern extends radially through all the data tracks in each servo section 120. The servo pattern is comprised of four distinct patterns: AGC field 302, SAM/SYNC field 306, Track ID field 304 and PES pattern 305. The AGC field 302 is the same at all radial positions. The SAM/SYNC field 306 is a regular series of transitions that form sync marks and are typically the same at all radial positions. The SAM/SYNC pattern is chosen such that it does not occur elsewhere in the servo pattern and does not occur in the data records. The AGC field 302 allows the servo controller to calibrate gain parameter for later fields while the SAM/SYNC field 306 is used to calibrate timing reference for later fields. The SAM/SYNC field is used to locate the end of the AGC field and to help locate the servo sector when the disk drive is initialized. The TID field 304 contains the track number, usually Gray-coded and written as the presence or absence of recorded dibits. The TID field 304 determines the integer part of the radial position. The servo positioning information in PES pattern 305 is a conventional quad-burst pattern comprising bursts A-D. The position error signal (PES) pattern 305 includes bursts A-D that are used to determine the fractional part of the radial position. Each PES burst A-D comprises a series of regularly spaced magnetic transitions, the transitions being the transitions between the alternating black and white regions in FIG. 4. FIG. 4 is written track-by-track, in half-track steps, with a regular write head.

Figure 5:
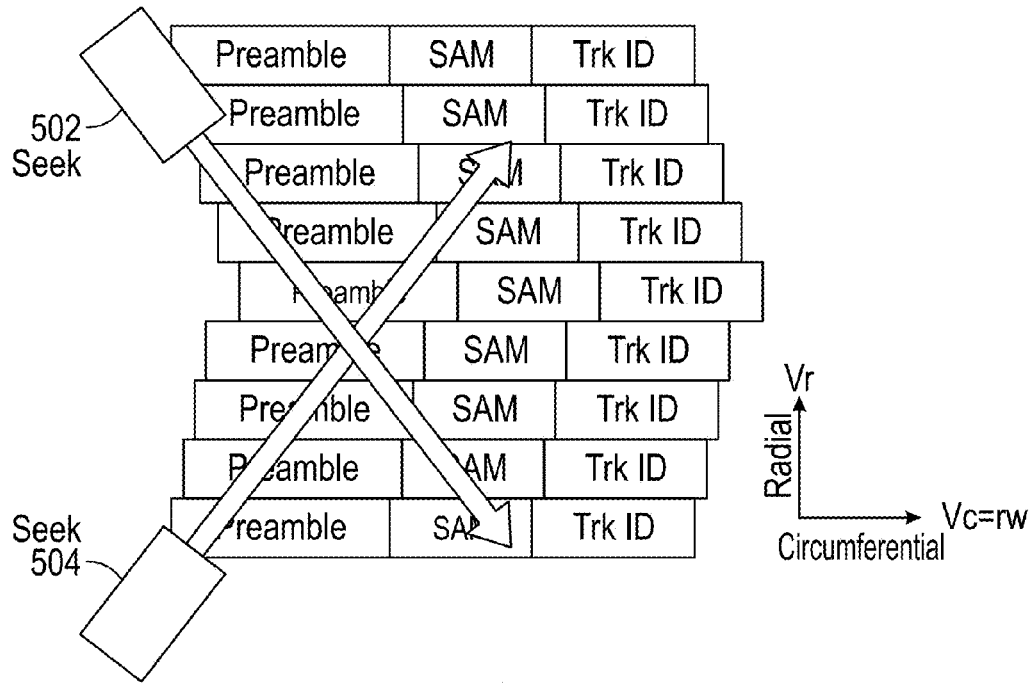
FIG. 5 is a schematic showing a group of portions of servo sectors in a single servo section that are misaligned circumferentially.

The servo sectors that form the radially-extending servo sections 120 are formatted or written during disk drive manufacturing. In FIG. 4, the servo sectors, including the sync marks in SAM/SYNC field 306 are depicted as being perfectly aligned circumferentially in all the tracks. However, the servo writing process may result in track-to-track circumferential misalignment of the servo sectors. This does not generally present a problem during track following, i.e., when the read head is maintained on a single track, because the frequency of the sync marks in the SAM/SYNC field 306 is constant. However, during a seek from one track to another track the read head has a radial velocity and may cross multiple tracks within a single servo section. If the misalignment of the sync marks from track-to-track is too large, the HDD may not be able to acquire synchronization or may lose synchronization because the misalignment causes the frequency of the sync marks to change with radial position. FIG. 5 is a schematic showing a group of portions of servo sectors in a single servo section that are misaligned circumferentially. Arrow 502 shows the path of the read head across the servo sectors during a seek in one radial direction, and arrow 504 shows the path of the read head across the servo sectors during a seek in the other radial direction. During a seek the head moves with a cross-track or radial velocity $V_r$. The disk is rotating with an angular velocity w that results in an effective along-the-track velocity $V_c = \omega r$ for the head, where r is the head radial position. Because the head is crossing the circumferentially misaligned preambles (the AGC fields) and the SAM/SYNC fields of multiple tracks in a single servo section the sync mark detector may be not be able to acquire sync.

Figure 6A:
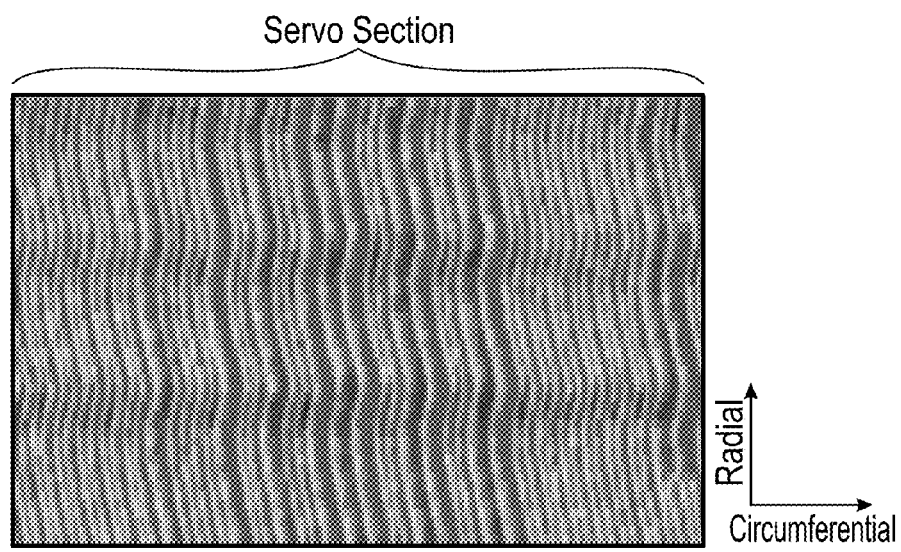
FIG. 6A is a scanning electron microscopy (SEM) image of a portion of a single servo section showing how the magnetic transitions are not perfectly aligned circumferentially.
Figure 6B:
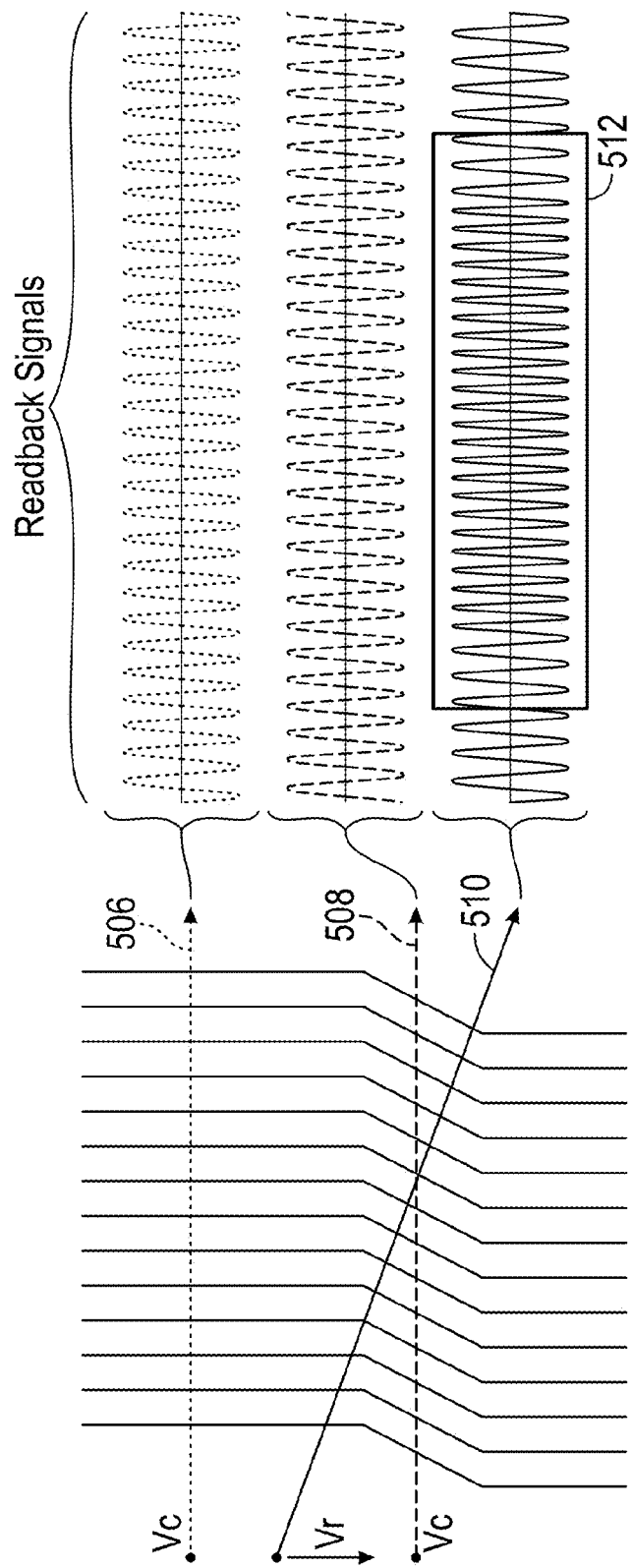
FIG. 6B is a set of lines schematically representing the misaligned transitions in FIG. 6A together with three paths of the read head relative to the servo section. circumferentially.
Figure 7:
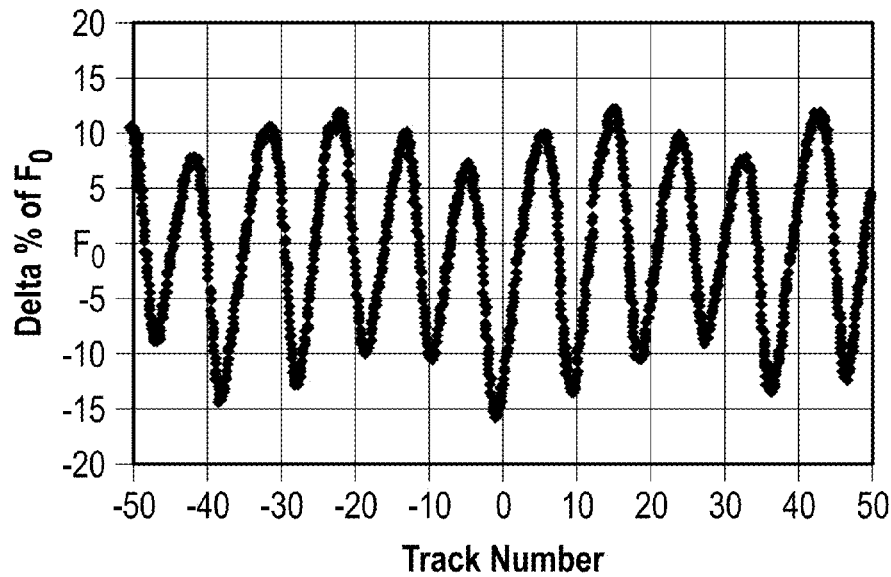
FIG. 7 is a graph of the percentage frequency change from a nominal frequency ($F_0$) as a function of radial position (track number) measured during a high-velocity seek across an actual servo section with circumferentially misaligned sync marks.

FIGS. 6A-6B illustrate the problem of acquiring sync during a seek across a single servo section when the servo sectors are misaligned circumferentially. FIG. 6A is a scanning electron microscopy (SEM) image of a portion of a single servo section showing how the magnetic transitions are not perfectly aligned circumferentially but form a wavy pattern in the radial direction. FIG. 6B is a set of lines schematically representing the misaligned transitions in FIG. 6A together with three paths of the head relative to the servo section. Paths 506 and 508 represent when the head is not seeking ($V_r = 0$). Path 506 is when the head is radially aligned with a portion of the servo section that is generally radially straight and path 508 is when the head is radially aligned with a portion of the servo section that is slanted. In both cases the transitions, for example the sync marks, move past the head with a constant frequency, resulting in the corresponding readback signals. However, if the head has a radial velocity $V_r$, as during a seek, it will make the path of arrow 510. In this path, the head will experience a changing frequency from the sync marks because it is moving across portions of the servo section with different amounts of circumferential misalignment of the sync marks. This is shown by the varying readback signal in box 512. FIG. 7 is a graph of the percentage frequency change from a nominal frequency ($F_0$) as a function of radial position (track number) measured during a high-velocity seek across an actual servo section with circumferentially misaligned sync marks. The graph is for a seek of 100 tracks (from track −50 to track +50) and shows that during the seek the frequency of the sync marks passing the head varies generally sinusoidally and ranges from about −15% to about +10% from the nominal frequency, i.e., from about $0.15 F_0$ to about $1.1 F_0$.

In an embodiment of this invention, the servo clock provides a varying frequency to the SAM/SYNC mark detector as a function of the radial position of the head as it crosses a servo section. The varying frequency compensates for circumferential misalignment of the sync marks. As the head moves radially across the tracks in a servo section during a seek, the frequency of the servo clock is adjusted based on the known radial velocity of the head and the known sync mark circumferential misalignment. The sync mark misalignment as a function of radius is measured as part of a calibration process, typically during disk drive manufacturing. The measured sync mark misalignment values can be stored in a look-up table or used in a curve-fitting algorithm to generate a polynomial function.

Figure 8:
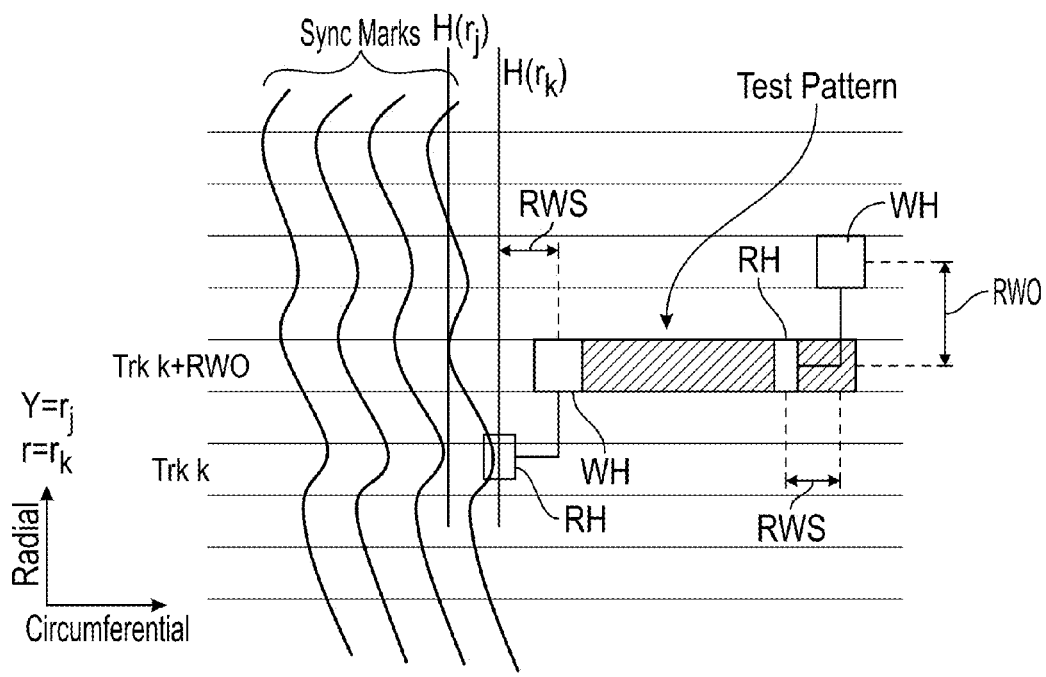
FIG. 8 is a schematic of a portion of a servo section with misaligned sync marks for illustrating the method of calibration of the sync mark circumferential misalignment.

One calibration method for measuring circumferential misalignment of the servo sectors will be explained with reference to FIG. 8. The circumferential misalignment of the sync marks as a function of radius is denoted as H(r). In this method the time delay between the read and write operations is measured. The read head (RH) and write head (WH) are physically separated in the radial and circumferential directions. The radial separation is defined as the read-write offset (RWO). The circumferential separation is defined as the read-write separation (RWS). In the first step of the calibration method the RH is moved to track k (trk k) at radius $r_k$. When the RH detects the end of the sync marks, i.e., when the RH is at the circumferential position corresponding to $H(r_k)$, a test pattern is written by the WH at position trk k+RWO at radius $r_j$ (in the example of FIG. 8 RWO is 2 tracks). The test pattern will be written at trk k+RWO with a circumferential position of $H(r_k)$+RWS. In the second step of the calibration method, the RH is moved to trk k+RWO (radius $r_d$). The time delay between detection of the last sync mark, i.e., when the RH is at circumferential position $H(r_j)$, and the detection of the test pattern on trk k+RWO is measured. This time delay $t_d$ is a known circumferential distance $d=r_j\omega t_d$, where $\omega$ is the angular velocity of the disk. Thus the misalignment can be calculated as follows:

$$H(r_k)-H(r_j)=d-RWS \quad \text{Equation (1)}$$

These steps are then repeated at multiple radial locations to obtain a set of H(r) values. These values can then be stored in memory as a look-up table of H values and associated r values. Alternatively these values can be used in a curve-fitting algorithm to generate a polynomial of H as a function of r. The term H(r) is the circumferential misalignment of the sync marks as a function of radius. The change in H(r) as a function of r can be defined as follows:

$$S(r)=\Delta H(r)/\Delta r \quad \text{Equation (2)}$$

The values of S(r) can be calculated from H(r) as part of the calibration method and stored in a look-up table. If H(r) is a polynomial then S(r) is just the derivative of H(r).

The method of calculating the frequency adjustment ΔF for the servo clock's nominal frequency $F_0$ will be explained with reference to FIG. 9. The adjusted servo clock frequency is $F_0+\Delta F$, where ΔF is a function of radial position of the head. The relationship between the change in frequency and the change in the time period is as follows:

$$F_0+\Delta F=1/(T_0+\Delta T) \quad \text{Equation (3)}$$

where $T_0=1/F_0$.

$$F_0 T_0+F_0\Delta T+\Delta F T_0+\Delta F\Delta T=1 \quad \text{From Equation (3)}$$

Ignoring small ΔF ΔT term, and using $F_0 T_0=1$, the following is obtained:

$$\Delta F\approx F_0^2\Delta T \quad \text{Equation (4)}$$

Figure 9:
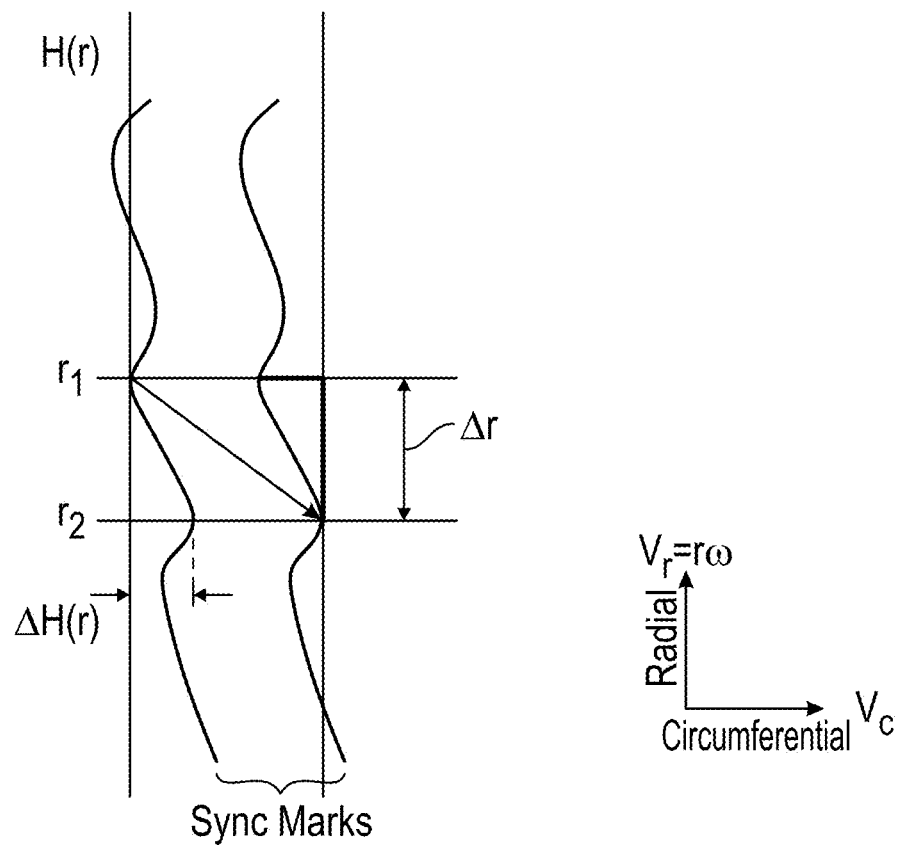
FIG. 9 is a schematic of a portion of a servo section with misaligned sync marks for illustrating the method of calculating the frequency adjustment according to an embodiment of the invention.

From FIG. 9, during time ΔT, the circumferential misalignment change is ΔH(r) as the head has moved a radial distance Δr from $r_1$ to $r_2$. The circumferential velocity is $V_c=r\omega$, so ΔT can be represented as follows:

$$\Delta T=\Delta H(r)/r\omega \quad \text{Equation (5)}$$

Substituting S(r) from Equation (2) into Equation (5) results in the following:

$$\Delta T=S(r)\Delta r/r\omega \quad \text{Equation (6)}$$

Substituting ΔT from Equation (6) into Equation (4) results in the following value for the frequency adjustment as a function of radius:

$$\Delta F(r)=\Delta F/\Delta r=-F_0^2 S(r)/r\omega \quad \text{Equation (7)}$$

Figure 10:
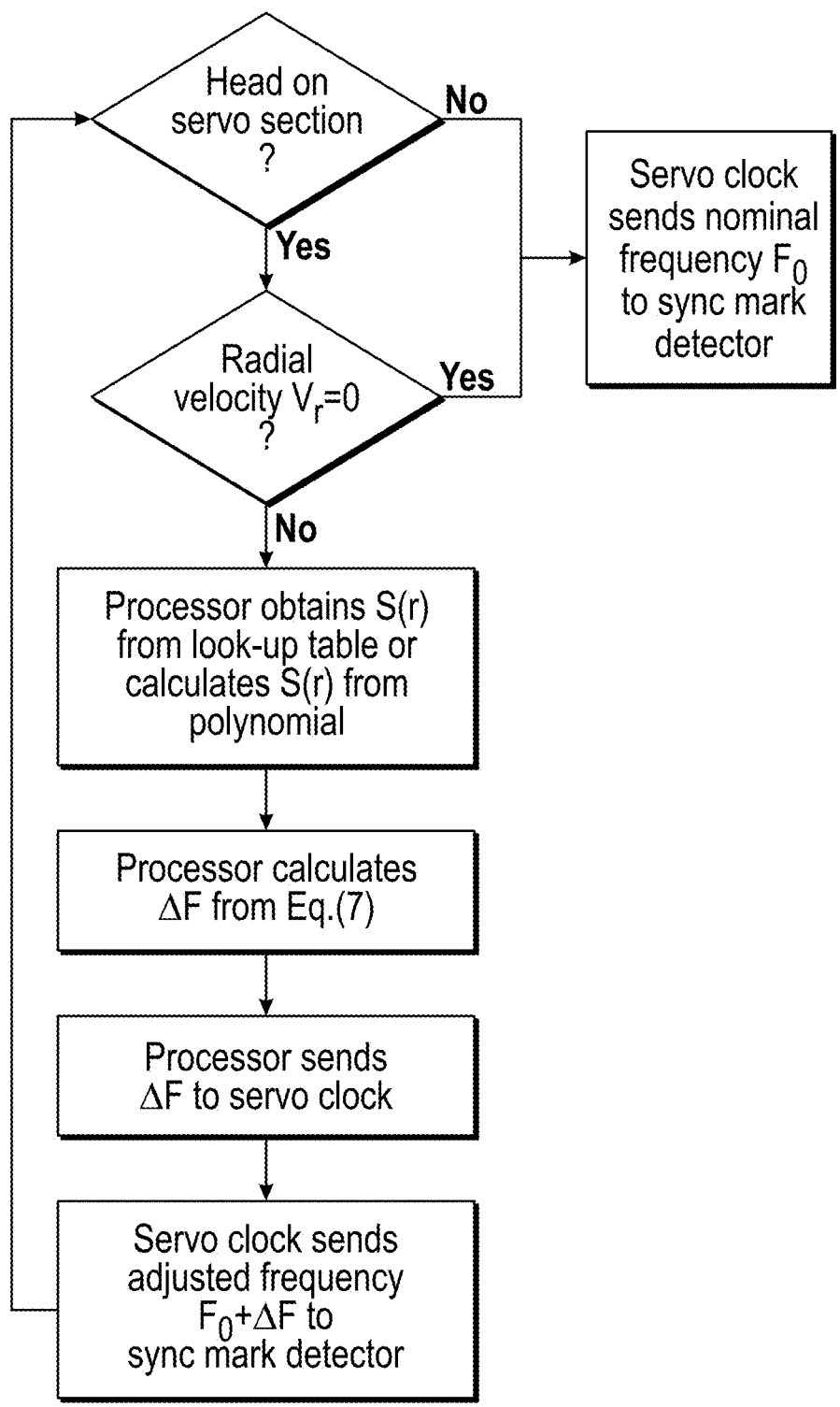
FIG. 10 is a flow chart illustrating the method of calculating a frequency adjustment and adjusting the servo clock frequency according to an embodiment of the invention.
Figure 11:
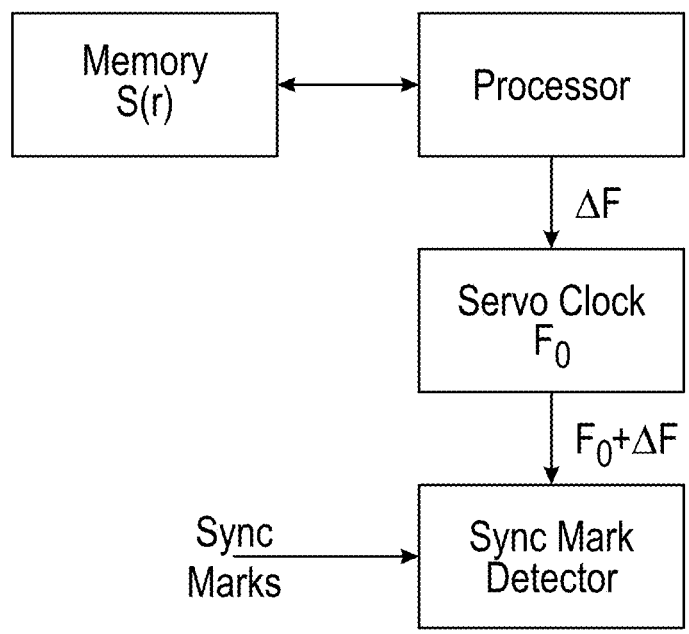
FIG. 11 is a block diagram of hardware elements for calculating a frequency adjustment and adjusting the servo clock frequency according to an embodiment of the invention.

FIG. 10 is a self-explanatory flow chart showing the method for continually adjusting the servo clock frequency with Equation (7) as the head moves radially across the servo section. FIG. 11 is a block diagram of the HDD hardware elements showing how the servo clock sends the adjusted frequency to the sync mark detector. The adjusted frequency adjusts the sample rate at which the sync mark detector samples the incoming sync marks.

In a modification of the method for adjusting servo clock frequency as a function of radial position of the read head during a seek, a ramping function can be applied, wherein each adjustment to the servo clock frequency is an incremental adjustment from the previous adjustment. The servo clock nominal frequency $F_0$ is thus continually ramped up or down during the time the head is crossing the servo section. The change in radius Δr in a time increment Δt as the head moves radially with a velocity $V_r$ is given as follows:

$$\Delta r=V_r\Delta t \quad \text{Equation (8)}$$

Substituting Equation (8) into Equation (7), the change in frequency in time Δt is given as follows:

$$\Delta F(r)/\Delta t=-F_0^2 S(r)V_r/r\omega \quad \text{Equation (9)}$$

Figure 12:
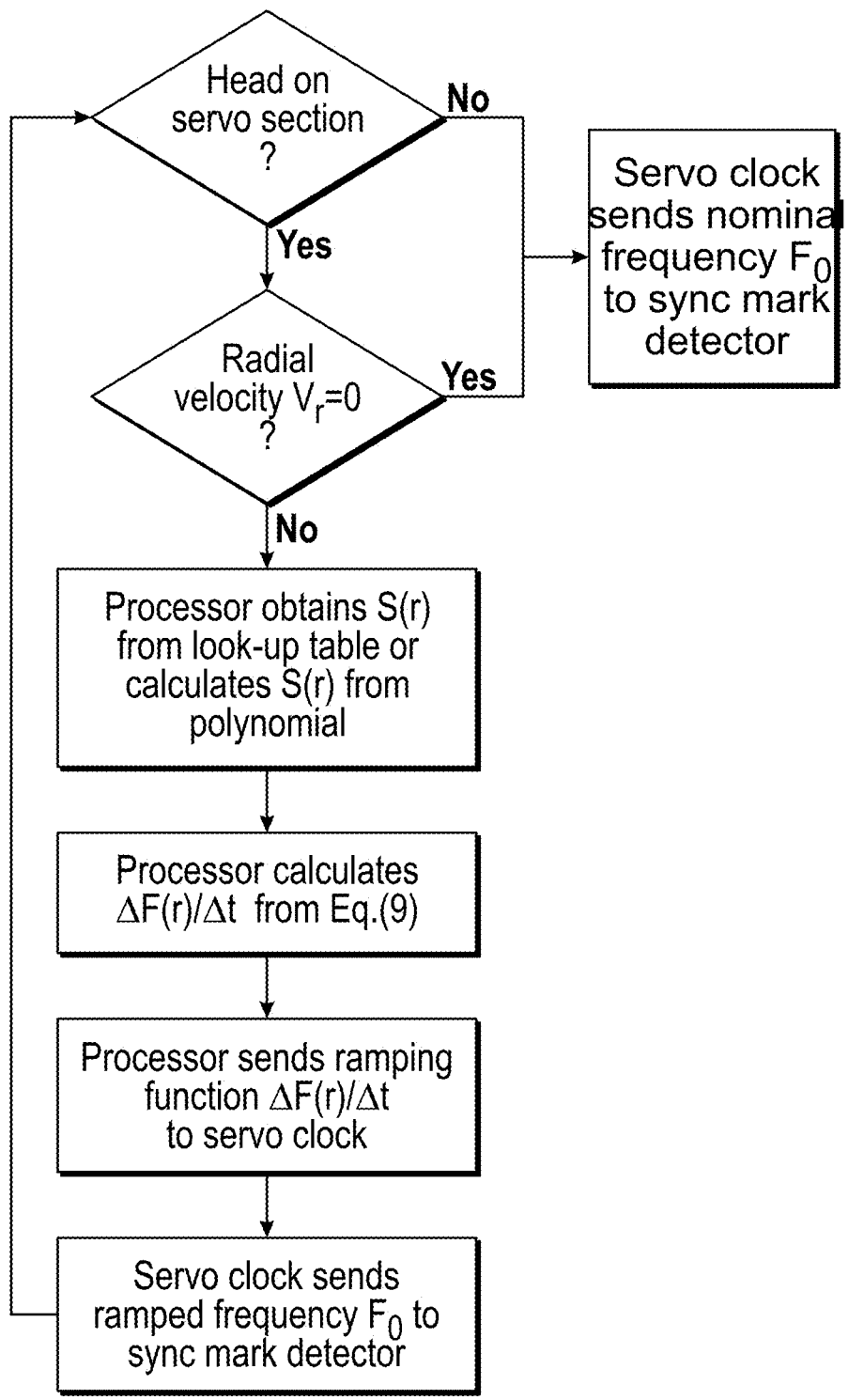
FIG. 12 is a flow chart illustrating the method of calculating a frequency adjustment ramping function and sending the ramping function to the servo clock according to an embodiment of the invention
Figure 13:
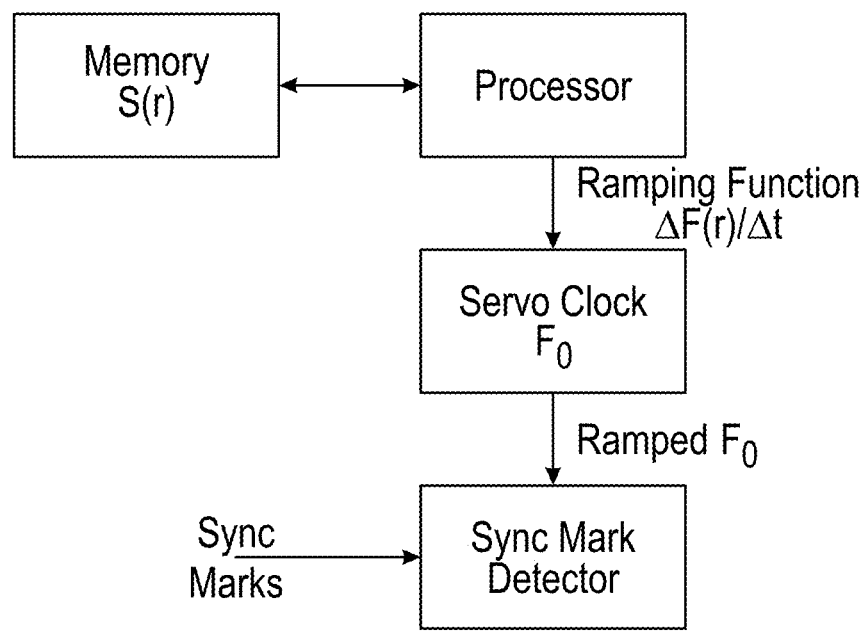
FIG. 13 is a block diagram of hardware elements for calculating a frequency adjustment ramping function and adjusting the servo clock frequency with the ramping function according to an embodiment of the invention.

Thus Equation (9) is a ramping function calculated from known values of r, ω and $V_r$ and from recalled or calculated values of S(r), and is used to adjust the servo clock frequency. Each subsequent calculation of the ramping function results in an incremental adjustment of the servo clock frequency from the previously adjusted frequency. The servo clock then sends a continuously ramped frequency $F_0$ to the sync mark detector. FIG. 12 is a self-explanatory flow chart showing the method for continually incrementing the servo clock frequency with the ramping function of Equation (9) as the head moves radially across the servo section. FIG. 13 is a block diagram of the HDD hardware elements showing how the servo clock sends the ramped frequency to the sync mark detector. The ramped frequency continually adjusts the sample rate at which the sync mark detector samples the incoming sync marks.

Figure 14A:
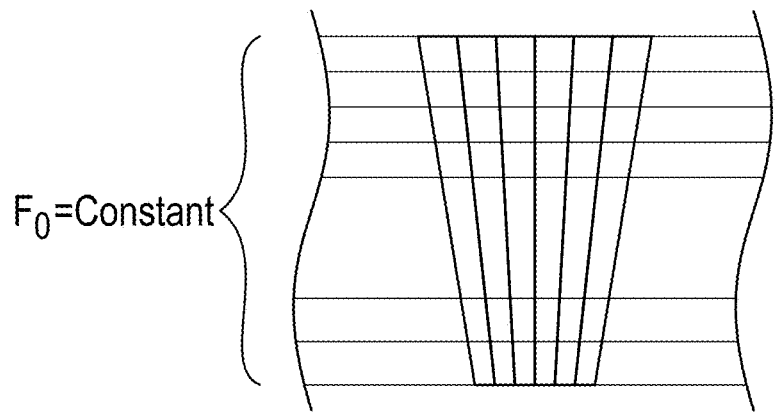
FIG. 14A is a schematic of a servo section for a conventional servo wherein the circumferential magnetic transition pitch (or bit pitch) varies continuously with radius so that the transition frequency is constant across an annular zone.
Figure 14B:
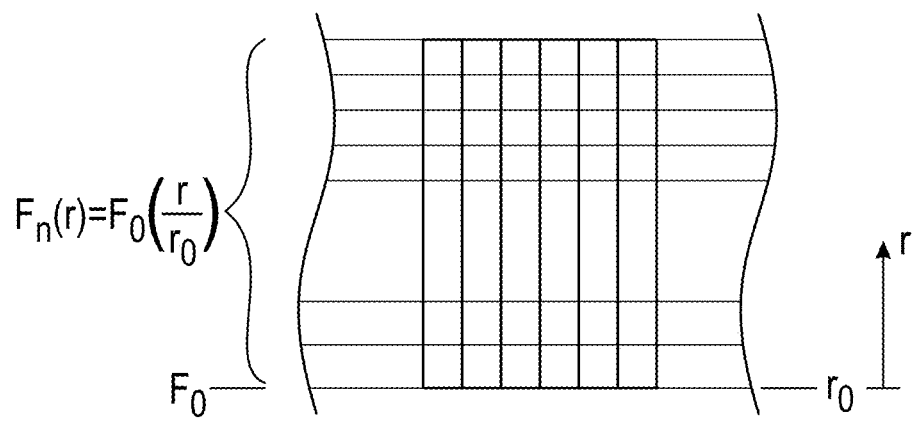
FIG. 14B is a schematic of a servo section for a continuous zoned servo that uses a constant bit pitch for all radial positions across a data zone so that the transition frequency is varies with radial position across an annular zone.

The above description of embodiments of the invention assumed a HDD with conventional servo wherein the circumferential magnetic transition pitch (or bit pitch) varies continuously with radius so that the transition frequency is constant across an annular zone. Thus at constant angular velocity w the servo clock has a nominal frequency $F_0$ that does not vary with radius. This is depicted schematically in FIG. 14A where $F_0$ is constant with radius. However, the invention is also fully applicable to proposed HDDs with continuous zoned servo that use a constant bit pitch for all radial positions across a data zone. Thus for a constant angular velocity ω, the circumferential velocity of the magnetic transitions, including the sync marks, will vary with radial position so that the servo clock nominal frequency will also vary with radius. This is depicted schematically in FIG. 14B where the nominal frequency as a function of radius as follows:

$$F_n(r)=F_0(r/r_0) \text{ where } F_0 \text{ is the frequency at radius } r_0. \quad \text{Equation (10)}$$

For this type of servo, the derivations of ΔF(r) (Equation (7)) and ΔF(r)/Δt (Equation (9)) become as follows:

$$\Delta F(r)=\Delta F/\Delta r=F_0/r_0-F_0^2 S(r)/r\omega \quad \text{Equation (11)}$$

$$\Delta F(r)/\Delta t=F_0 V_r/r_0-F_0^2 S(r) V_r/r\omega \quad \text{Equation (12)}$$

The operation of embodiments of this invention as described above, for example as shown in the equations and flow charts, may be implemented as a set of computer program instructions stored in memory and executable by a processor, such as the processor 116, or by a controller, such as in controller electronics 115. The processor or controller may perform logical and arithmetic operations based on the program instructions stored in memory, and/or the functions described above may be performed by hardware.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
   a rotatable magnetic recording disk having a magnetic recording layer, the recording layer having a plurality of radially-spaced tracks, each track having circumferentially spaced servo sectors containing synchronization (sync) marks, wherein the servo sectors in each track are generally aligned circumferentially with the servo sectors in adjacent tracks to form servo sections that extend generally radially across the tracks, and wherein some of the sync marks in some of the servo sectors are circumferentially misaligned with their radially adjacent sync marks;
   a read head for reading the sync marks in the servo sectors as the disk rotates;
   an actuator connected to the head for causing the head to seek radially from one track to another track;
   a sync mark detector coupled to the read head for sampling the sync marks;
   a servo clock for generating a variable frequency to the sync mark detector as the read head crosses a servo section during a seek, the variable frequency being in response to the sync mark circumferential misalignment and to the radial position of the read head as it crosses a servo section during a seek.

2. The disk drive of claim 1 wherein some of the sync marks have a misalignment from a nominal circumferential position as a function of radius, H(r), and wherein the servo clock generates a frequency as a function of radius, F(r), in response to H(r).

3. The disk drive of claim 2 wherein the rate of change of H(r) as a function of radius is S(r), and wherein the servo clock generates F(r) in response to S(r).

4. The disk drive according to claim 3 further comprising memory coupled to the servo clock, said memory containing a table of values of S(r) and associated values of r.

5. The disk drive according to claim 4 wherein the servo clock operates at a nominal frequency $F_0$ and wherein the servo clock generates a frequency adjustment $\Delta F(r)=-F_0^2 S(r)/r\omega$, where ω is the angular velocity of the disk and r is the radial position of the read head during its crossing of the servo section.

6. The disk drive according to claim 4 wherein the servo clock operates at a nominal frequency $F_n(r)=F_0(r/r_0)$ as a function of radius r, where $F_0$ is the nominal frequency at radius $r_0$, and wherein the servo clock generates a frequency adjustment $\Delta F(r)=F_0/r_0-F_0^2 S(r)/r\omega$, where ω is the angular velocity of the disk and r is the radial position of the read head during its crossing of the servo section.

7. A magnetic recording disk drive comprising:
   a rotatable magnetic recording disk having a magnetic recording layer, the recording layer having a plurality of radially-spaced tracks, each track having circumferentially spaced servo sectors containing synchronization (sync) marks, wherein the servo sectors in each track are generally aligned circumferentially with the servo sectors in adjacent tracks to form servo sections that extend generally radially across the tracks, and wherein the sync marks in a plurality of the tracks are misaligned from a nominal circumferential position;
   a read head for reading the sync marks in the servo sectors as the disk rotates;
   an actuator connected to the head for causing the head to seek radially from one track to another track;
   a sync mark detector coupled to the read head for sampling the sync marks at a sampling rate;
   a servo clock for generating a frequency to the sync mark detector to adjust the sampling rate as the read head crosses a servo section during a seek, the servo clock being operable at a nominal frequency $F_0$ and capable of adjusting said nominal frequency;
   a processor coupled to the servo clock for generating a frequency adjustment, and memory coupled to the processor and containing a program of instructions readable by the processor, the program of instructions undertaking method acts comprising:
   calculating, from the radial position (r) of the head during its crossing of the servo section and from sync mark misalignment, a frequency adjustment as a function of radial position; and
   sending said frequency adjustment to the servo clock.

8. The disk drive of claim 7 wherein the memory includes values of sync mark circumferential misalignment H(r) and associated values of r, and wherein the method act of calculating a frequency adjustment comprises recalling H(r) values from memory.

9. The disk drive of claim 7 wherein the memory includes values representing a polynomial of sync mark circumferential misalignment H(r) as a function of r, and wherein the method act of calculating a frequency adjustment comprises calculating H(r) from r.

10. The disk drive of claim 7 wherein the memory includes values of rate of change of sync mark circumferential misalignment S(r) and associated values of r, and wherein the method act of calculating a frequency adjustment comprises recalling S(r) values from memory.

11. The disk drive according to claim 10 wherein the method act of calculating a frequency adjustment includes calculating a value $-F_0^2 S(r)/r\omega$, where ω is the angular velocity of the disk.

12. The disk drive of claim 7 wherein the memory includes values representing a polynomial of rate of change of sync mark circumferential misalignment S(r) as a function of r, and wherein the method act of calculating a frequency adjustment comprises calculating S(r) from r.

13. The disk drive according to claim 12 wherein the method act of calculating a frequency adjustment includes calculating a value $-F_0^2 S(r)/r\omega$, where $\omega$ is the angular velocity of the disk.

14. The disk drive according to claim 7 wherein the servo clock operates at a nominal frequency $F_n(r)=F_0(r/r_0)$ as a function of radius r, where $F_0$ is the nominal frequency at radius $r_0$, and wherein the method act of calculating a frequency adjustment includes calculating a value $F_0/r_0 - F_0^2 S(r)/r\omega$, where $\omega$ is the angular velocity of the disk.

15. The disk drive of claim 7 wherein the method act of calculating a frequency adjustment includes continually calculating a frequency adjustment for successive values of r as the read head crosses a servo section, and wherein the method act of sending the frequency adjustment to the servo clock comprises continually ramping the servo clock nominal frequency with successive calculated frequency adjustments.

\* \* \* \* \*